US009710734B2

(12) United States Patent
Sasami

(10) Patent No.: US 9,710,734 B2
(45) Date of Patent: *Jul. 18, 2017

(54) IMAGE FORMING APPARATUS, IMAGE PRINTING METHOD, AND COMPUTER-READABLE RECORDING MEDIUM HAVING STORED THEREIN IMAGE PRINTING CONTROL PROGRAM

(71) Applicant: KONICA MINOLTA, INC., Chiyoda-ku, Tokyo (JP)

(72) Inventor: Shingo Sasami, Hino (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/241,184

(22) Filed: Aug. 19, 2016

(65) Prior Publication Data
US 2016/0358048 A1 Dec. 8, 2016

Related U.S. Application Data

(63) Continuation of application No. 14/740,415, filed on Jun. 16, 2015, now Pat. No. 9,456,107.

(30) Foreign Application Priority Data

Jun. 20, 2014 (JP) ................................. 2014-127543

(51) Int. Cl.
*G03G 15/18* (2006.01)
*G06K 15/02* (2006.01)
(Continued)

(52) U.S. Cl.
CPC ....... *G06K 15/1805* (2013.01); *G03G 15/652* (2013.01); *G06K 15/022* (2013.01);
(Continued)

(58) Field of Classification Search
CPC ............ G06K 15/1805; G06K 15/022; G06K 15/1835; G06K 15/186; G03G 15/652; H04N 1/40; H04N 1/3935
See application file for complete search history.

(56) References Cited

U.S. PATENT DOCUMENTS 7,004,654 B2 2/2006 Shibata et al.
2002/0001481 A1 1/2002 Kiuchi
(Continued)

FOREIGN PATENT DOCUMENTS

AU 2011200772 A1 4/2012
CN 102079182 A 6/2011
(Continued)

OTHER PUBLICATIONS

Office Action (Notification of Reasons for Refusal) issued on Aug. 4, 2016, by the Japanese Patent Office, in corresponding Japanese Patent Application No. 2014-127543, and an English language translation of the Office Action (6 pages).

(Continued)

*Primary Examiner* — Clayton E Laballe
*Assistant Examiner* — Ruiffing Pu
(74) *Attorney, Agent, or Firm* — Buchanan Ingersoll & Rooney PC

(57) ABSTRACT

An image forming apparatus includes an image forming section that performs processing for forming an image on continuous paper on the basis of image data and a processor configured to perform image preparation to convert the printing data into the image data and control the image forming section to execute forming of an image on the continuous paper based on the image data. The processor is further configured to perform, before the image formation, second forming speeds setting according to image sizes in a (Continued)

paper passing direction, predetermined first image forming speeds, and image preparation times related to the images.

20 Claims, 11 Drawing Sheets

(51) Int. Cl.
  *G03G 15/00* (2006.01)
  *H04N 1/40* (2006.01)
  *H04N 1/393* (2006.01)
(52) U.S. Cl.
  CPC ....... *G06K 15/186* (2013.01); *G06K 15/1835* (2013.01); *H04N 1/3935* (2013.01); *H04N 1/40* (2013.01); *G03G 15/6564* (2013.01)

(56) References Cited

U.S. PATENT DOCUMENTS

| | | |
|---|---|---|
| 2004/0184862 A1 | 9/2004 | Shibata et al. |
| 2005/0206715 A1 | 9/2005 | Sasaki |
| 2006/0257179 A1 | 11/2006 | Kim |
| 2008/0130035 A1 | 6/2008 | Smith |
| 2008/0159792 A1 | 7/2008 | Egi |
| 2009/0142113 A1 | 6/2009 | Kajita |
| 2010/0172669 A1 | 7/2010 | Nakayama |
| 2011/0002699 A1 | 1/2011 | Aoki |
| 2011/0109941 A1 | 5/2011 | Kasai et al. |
| 2011/0188908 A1 | 8/2011 | Ishida |
| 2011/0206406 A1 | 8/2011 | Suzuki |
| 2011/0211873 A1 | 9/2011 | Ichiki |
| 2011/0310138 A1* | 12/2011 | Mano .................... B41J 19/202 347/5 |
| 2012/0070160 A1 | 3/2012 | Aoki |
| 2012/0308254 A1 | 12/2012 | Suzuki |
| 2013/0279926 A1 | 10/2013 | Yoshimura |
| 2013/0279953 A1 | 10/2013 | Chikugo |
| 2014/0301751 A1 | 10/2014 | Takagi |
| 2015/0043015 A1 | 2/2015 | Warren |
| 2015/0104228 A1 | 4/2015 | Moriguchi |
| 2015/0153690 A1 | 6/2015 | Suzuki |

FOREIGN PATENT DOCUMENTS

| | | |
|---|---|---|
| JP | 2008-015609 A | 1/2008 |
| WO | WO 03/011603 A1 | 2/2003 |

OTHER PUBLICATIONS

Office Action (The First Office Action) issued on Apr. 12, 2017, by the State Intellectual Property Office of the People's epublic of China in corresponding Chinese Patent Application No. 201510345491.8 and an English Translation of the Office Action. (26 pages).

* cited by examiner

IMAGE FORMING APPARATUS, IMAGE PRINTING METHOD, AND COMPUTER-READABLE RECORDING MEDIUM HAVING STORED THEREIN IMAGE PRINTING CONTROL PROGRAM

CROSS-REFERENCE TO RELATED APPLICATIONS

This application is a continuation of U.S. patent application Ser. No. 14/740,415, and claims priority under 35 U.S.C. §119 to Japanese Patent Application No. 2014-127543, filed Jun. 20, 2014, the entire disclosure of which is incorporated herein by reference in its entirety.

BACKGROUND OF THE INVENTION

Field of the Invention

The present invention relates to an image forming apparatus, an image printing method, and a computer-readable recording medium having stored therein an image printing control program for printing images on continuous paper at fixed intervals.

Description of the Related Art

In an image forming apparatus that prints images on continuous paper, it is desirable to set an interval between the images, that is, a blank region as small as possible because the interval becomes a break. However, high resolution of printing jobs has been further enhanced. The image interval set small is late for printing timing for forming the next image.

As measures against this problem, Japanese Patent Application Laid-Open No. 2008-15609 (Cited Reference 1) proposes a continuous-paper printing apparatus that determines whether generation of image data is in time for printing timing based on the image data and, when determining that the generation of the image data is late, dynamically inserts a predetermined number of skip pages among printing pages based on the generated image data to continue a printing operation without stopping the printing operation halfway in printing.

However, in the technique proposed in Cited Reference 1, it is possible to prevent the printing operation from being stopped halfway in the printing. However, since blank pages are inserted, regions to be breaks increase. It is conceivable to change the size of the image interval according to necessity. However, when processing is performed in a post-processing apparatus after the printing ends, in some case, die cutting, cutting, labeling, or the like is performed without performing precise alignment assuming that a printed image interval is fixed. If intervals among images are irregular, proper post-processing cannot be performed.

In the case of an analog printing machine, since the analog printing machine is configured to repeatedly print an image, a plate of which is manufactured, at a fixed cycle. Therefore, if image forming speed is fixed, it is easy to guarantee that images are formed at equal intervals. On the other hand, in the case of a digital printing machine, an image is written after image data is prepared in a unit of a page. Time required for the preparation fluctuates according to complexity of RIP (raster image processor) processing of the image data, presence or absence of page numbering, and the like. Therefore, even if an image size is always fixed, it is difficult to guarantee image arrangement at equal intervals on continuous paper. The image preparation time also depends on a processing ability of an image forming apparatus. Therefore, the image preparation time cannot be accurately calculated unless printing data is actually converted into image data from which an image can be formed. The demand of the image interval for the printing on the continuous paper cannot be satisfied.

If a delay of 1 millisecond occurs at linear velocity of 300 mm/second, the image interval delays by 1*300/1000=0.3 mm. This is unallowable variation in the field of commercial printing.

At least one object of the present invention is to provide an image forming apparatus, an image printing method, and a computer-readable recording medium having stored therein an image printing control program that can set an unnecessary blank region as small as possible such that image preparation processing is in time for image formation and can surely perform post-processing by arranging images at equal intervals and printing the images.

SUMMARY OF THE INVENTION

To achieve at least one of the abovementioned objects, an image forming apparatus reflecting one aspect of the present invention comprises: an image forming section that performs processing for forming an image on continuous paper on the basis of image data; and a control section that performs image preparation for converting printing data into image data from which an image can be formed and controls the image forming section to execute printing of a plurality of images at equal intervals on the continuous paper. The control section performs, before the image formation processing, according to image sizes in a paper passing direction, image forming speeds, and image preparation times related to the images, printing condition setting for setting an interval of the images.

In the abovementioned display device, it is preferable that, in the printing condition setting, the control section can performs setting of the interval of the images and setting of the image forming speed.

In the abovementioned display device, it is preferable that, in the printing condition setting, when image formation at image forming speed set in advance is late for image formation at a predetermined image interval, the control section sets the image interval within the predetermined image interval and sets the image forming speed lower than the image forming speed set in advance.

In the abovementioned display device, it is preferable that, in the printing condition setting, the control section calculates image preparation times with respect to all images of the printing data and calculates an image interval on the basis of a maximum of the image preparation times.

In the abovementioned display device, it is preferable that, in the printing condition setting, the control section calculates image preparation times with respect to images from a first image to a predetermined number of the printing data and calculates an image interval on the basis of a maximum of the image preparation times.

In the abovementioned display device, it is preferable that, in the printing condition setting, the control section calculates image preparation times of image data having a characteristic presumed to take time for image preparation and calculates an image interval on the basis of a maximum of the image preparation times.

In the abovementioned display device, it is preferable that, in the printing condition setting, in a case of printing data configured by repetition of a same image or an image obtained by processing a part of the same image, the control section calculates the image interval on the basis of an image preparation time of first one image.

In the abovementioned display device, it is preferable that, in the printing condition setting, in a case of printing data configured by a plurality of prints, the control section calculates the image interval on the basis of printing data of a first print.

In the abovementioned display device, it is preferable that, after receiving an execution instruction for a printing operation, the control section calculates the image interval in the printing condition setting.

In the abovementioned display device, it is preferable that the control section stores, in association with the printing data, printing conditions set in the printing condition setting and does not perform recalculation of the printing conditions when same printing data is reprinted.

In the abovementioned display device, it is preferable that, when a notification request for printing conditions is sent from a printing data creating apparatus outside the image forming apparatus to the image forming apparatus, after receiving the printing data, the control section performs the printing condition setting and notifies the printing data creating apparatus of the obtained printing conditions.

In the abovementioned display device, it is preferable that, when layout processing for the image data is set in a job, the control section performs image formation on the basis of image data for which a layout position is determined on the basis of the set image interval.

In the abovementioned display device, it is preferable that the control section notifies a user of the set printing conditions.

In the abovementioned display device, it is preferable that the control section notifies the user of the printing conditions after printing.

In the abovementioned display device, it is preferable that the control section notifies the user of the printing conditions set before a printing start to enable the user to select the printing conditions or instruct to stop printing.

In the abovementioned display device, it is preferable that the control section controls the image forming section to print, in a margin portion of continuous paper, setting information set under the printing conditions.

In the abovementioned display device, it is preferable that in the printing condition setting, the control section calculates the image preparation time while causing control affecting a conversion processing time of the image data to operate same as an actual image forming operation.

To achieve at least one of the abovementioned objects, an image printing method reflecting one aspect of the present invention comprises a first form of the present invention includes: an image preparing step for performing image preparation for converting printing data into image data from which an image can be formed; a printing condition setting step for setting, before the image formation, an interval of images according to image sizes in a paper passing direction, image forming speeds, and image preparation time related to the images; and an image forming step for arranging, on the basis of the image data, a plurality of images at equal intervals on continuous paper according to the printing conditions and forming an image.

To achieve at least one of the abovementioned objects, a computer-readable recording medium, reflecting one aspect of the present invention, having stored therein an image printing control program executed by a control section that controls an image forming apparatus that performs processing for forming an image on continuous paper on the basis of image data, the image formation control program executing in the control section comprises:

an image preparing step for performing image preparation for converting printing data into image data from which an image can be formed;

a printing condition setting step for setting, before the image formation, an interval of images according to image sizes in paper passing directions, image forming speeds, and image preparation times related to the images; and an image forming step for arranging, on the basis of the image data, a plurality of images at equal intervals on continuous paper according to the printing conditions and forming an image.

DETAILED DESCRIPTION OF THE PREFERRED EMBODIMENTS

An embodiment of the present invention is explained below with reference to the drawings.

Figure 1:
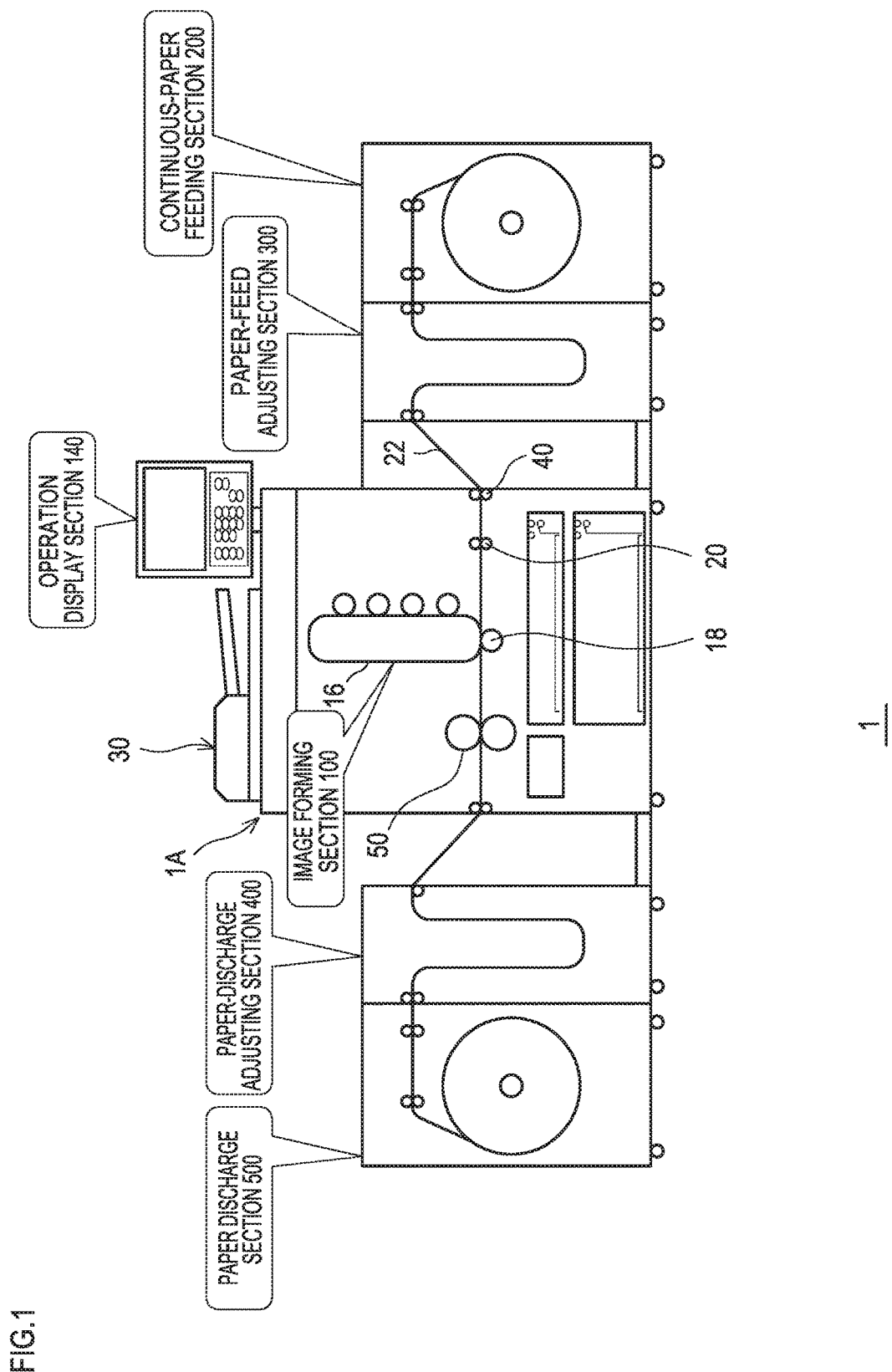
FIG. 1 is a schematic diagram showing an image forming apparatus in an embodiment of the present invention.

FIG. 1 shows an image forming apparatus in the embodiment of the present invention.

An image forming apparatus 1 includes an apparatus main body 1A. A paper-feed adjusting section 300 is connected to a front stage side of the apparatus main body 1A. A continuous-paper feeding section 200 is connected to a front stage side of the paper-feed adjusting section 300. A paper-discharge adjusting section 400 is connected to a paper discharge side of the apparatus main body 1A. A paper discharge section 500 is connected to a paper discharge side of the paper-discharge adjusting section 400.

Note that the image forming apparatus can also be configured by only the apparatus main body 1A and is not limited to the configuration of this embodiment.

In this embodiment, a post-processing apparatus that performs appropriate post-processing such as laminating and cutting can be connected to the image forming apparatus 1. The post-processing apparatus can be provided in the image forming apparatus. The post-processing apparatus can be connected to the apparatus main body to configure the image forming apparatus. The post-processing apparatus can be connected to the image forming apparatus to configure an image forming system.

The continuous-paper feeding section 200 has a function of housing and storing roll paper and feeding the paper to the apparatus main body 1A. The roll paper is equivalent to roll paper of the present invention. The paper discharge section 500 has a function of holding the roll paper discharged from the apparatus main body 1A.

The paper-feed adjusting section 300 has a buffer function for absorbing a very small speed difference and deviation between the continuous-paper feeding section 200 and the apparatus main body 1A. The paper-discharge adjusting section 400 has a buffer function for absorbing a very small speed difference and deviation between the paper discharge section 500 and a printer.

Note that, in this embodiment, the roll paper is used as continuous paper. However, the continuous paper is not limited to the roll paper and only has to be continuing papers. The continuous paper can be provided in a form of the roll paper or for example, the continuous paper can be fed from an alternately folded form.

The image forming apparatus 1 includes, in the apparatus main body 1A, an image forming section 100 that forms an image on a paper. The image forming apparatus 1 includes, in an upper part of the apparatus main body 1A, an operation display section 140 that receives operation by an operator and displays information. In the operation display section 140, an operation section for performing operation and a display section for performing display can be separately configured. Like a touch panel LCD, the operation section and the display section can be integrally configured. The operation display section 140 can receive a printing action and a setting change and perform display of various kinds of information.

The image forming apparatus 1 includes, on the apparatus main body 1A, an automatic document feeding device that automatically reads a document and a document reading section 30 capable of performing image reading through platen glass. An image of the document is read by the document reading section 30 and once recorded in a not-shown image memory or the like. The read image is used for formation of an image by the image forming section 100.

The image forming section 100 includes photosensitive bodies respectively prepared for colors (cyan, magenta, yellow, black, etc.). Not-shown charging devices, writing sections, and developing units are disposed in peripheral line portions of the photosensitive bodies. The surfaces of the photosensitive bodies charged by the charging devices are subjected to image exposure by the writing sections such as LDs on the basis of image information of the document recorded in the image memory or the like. Latent images are formed on the surfaces of the photosensitive bodies. The latent images are developed by the developing units to be toner images. The toner images are transferred onto an intermediate transfer belt 16. An image on the intermediate transfer belt 16 is carried by a conveying path 22 and transferred onto a conveyed paper while being compression-bonded by a secondary transfer roller 18. The image forming section 100 performs image formation by an electrophotographic process and transfers the image onto the paper.

In the image forming section 100, not-shown cleaning sections that come into contact with the photosensitive bodies and remove residual toner are disposed further on a rotating direction side than contact positions with the intermediate transfer belt 16 and further on a rotating direction opposite side than the charging devices to correspond to the photosensitive bodies. A not-shown another cleaning section that removes the residual toner of the intermediate transfer belt 16 is disposed further on the rotating direction side than a paper transfer position of the intermediate transfer belt 16 and further on the rotating direction opposite side than a transfer position from the photosensitive bodies.

Note that the photosensitive bodies are driven to rotate by a not-shown driving motor. The intermediate transfer belt 16 is also driven to rotate by a not-shown driving motor.

The image forming apparatus 1 includes the conveying path 22 that leads from the continuous-paper feeding section 200 to the paper-feed adjusting section 300 and the image forming section 100 and leads from the image forming section 100 to the paper-discharge adjusting section 400 and the paper discharge section 500.

The conveying path 22 feeds and conveys the paper and configures a part of a paper conveying section. In the conveying path 22, the roll paper housed in the continuous-paper feeding section 200 is fed and the roll paper is conveyed to the image forming section 100 through a conveying roller 40 and a registration roller 20.

The paper having the image transferred thereon is compression-bonded by a fixing section 50 and applied with heat and pressure while being conveyed, whereby the toner image on the paper is fixed. The paper is discharged to the outside of the apparatus main body 1A.

In the image forming apparatus 1, the roll paper conveyed by the conveying path 22 reaches the paper-discharge adjusting section 400. A very small speed difference and deviation of the roll paper are absorbed by a buffer mechanism.

The continuous paper passed through the paper-discharge adjusting section 400 reaches the paper discharge section 500 through the conveying path 22. The continuous paper is wound around a roll and held.

Figure 2:
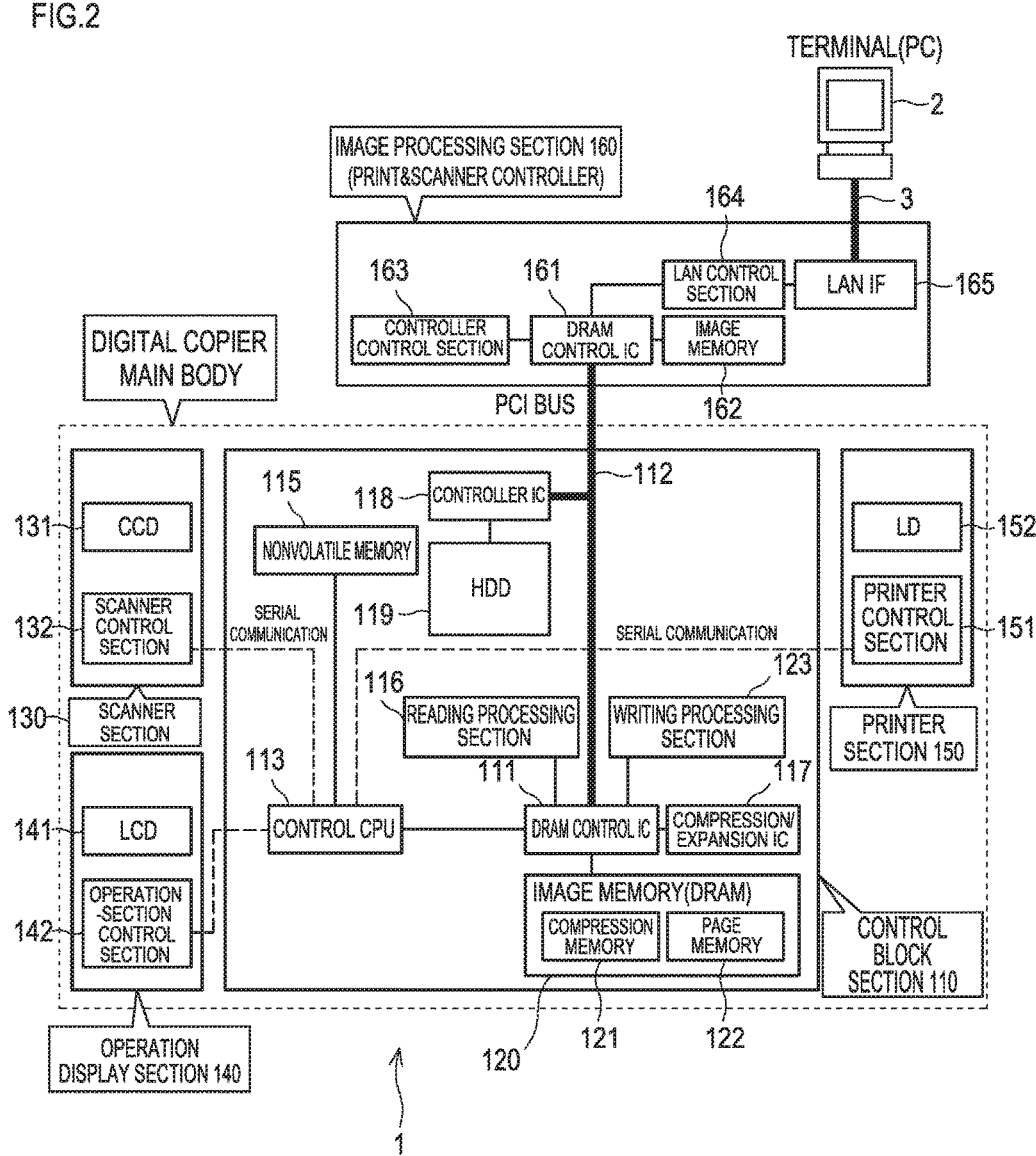
FIG. 2 is a diagram showing control blocks of the image forming apparatus and an image forming system in the embodiment.

FIG. 2 is a block diagram showing the electric configurations of the image forming apparatus and the image forming system of the present invention. The electric configurations are explained below.

The image forming apparatus 1 includes, as main components, a copier main body including a control block section 110, a scanner section 130, the operation display section 140, and a printer section 150 and an image processing section (a print & scanner controller) 160 that processes image data input to and output from an external apparatus (e.g., a terminal (a PC) 2 through a LAN. The image processing section 160 configures an image-data creating device in the present invention.

The control block section 110 includes a PCI bus 112. The PCI bus 112 is connected to a DRAM control IC 111 in the control block section 110. The control block section 110 includes a control CPU 113. The DRAM control IC 111 is connected to the control CPU 113. A nonvolatile memory 115 is connected to the control CPU 113. In the nonvolatile memory 115, an image formation control program and other programs for causing the control CPU 113 to operate, setting data of the image forming apparatus 1, setting data of a deviation correction adjustment amount due to paper characteristics of the paper such as process control parameters, and the like are stored.

The control CPU 113 controls the entire image forming apparatus 1 and grasps a state of the entire image forming apparatus. The control CPU 113 performs image formation control, calculation of image preparation times, setting of an image interval, and the like. That is, the control CPU 113 functions as a part of the control section of the present invention.

The image formation control program of the present invention is stored in the nonvolatile memory 115 in advance. Besides, the image formation control program can be introduced by a removable nonvolatile memory.

The scanner section 130 includes a CCD 131 that performs optical reading and a scanner control section 132 that performs control of the entire scanner section 130. The scanner control section 132 is serially communicably connected to the control CPU 113 and receives control by the control CPU 113. Note that the scanner control section 132 can be configured by a CPU, a program for causing the CPU to operate, and the like. Image data read by the CCD 131 is subjected to data processing by a reading processing section 116.

The operation display section 140 includes an LCD 141 of a touch panel type and an operation-section control section 142. The LCD 141 and the operation-section control section 142 are connected. The operation-section control section 142 and the control CPU 113 are serially communicably connected. With the configuration, control of the operation display section 140 is performed by the control CPU 113. Note that the operation-section control section 142 can be configured by a CPU, a program for causing the CPU to operate, and the like. In the operation display section 140, setting in the image forming apparatus and an input of operation control conditions such as an operation command are possible. Further, display of setting content, a machine state, and information and the like are possible. The operation display section 140 is controlled by the control CPU 113. Printing conditions including a set image interval and set image forming speed can be displayed and notified to the operator and predetermined operation and the like can be performed by the operation display section 140.

The DRAM control IC 111 is connected to an image memory 120 including a compression memory 121 and a page memory 122. In the image memory, image data acquired by the scanner section 130 and image data acquired through a LAN 3 are stored. As explained above, the image memory is a storage region for image data. The image memory stores image data of a printing job. Image data concerning a plurality of jobs can be stored in the image memory by the DRAM control IC 111. That is, image data of a reserved job can be stored in the image memory.

A compression/expansion IC 117 that compresses or expands compressed image data is connected to the DRAM control IC 111. Further, a writing processing section 123 is connected to the DRAM control IC 111. The printer section 150 includes a printer control section 151 that controls the entire printer section 150. The printer control section 151 is connected to the control CPU 113 and receives control. That is, the printer control section 151 performs start/stop of a print operation according to parameters given from the control CPU 113. The printer section 150 includes the image forming section 100 and the registration roller 20. Control of the operations of the image forming section 100 and the registration roller 20 is performed by the control CPU 113.

A DRAM control IC 161 of the image processing section (the print & scanner controller) 160 is connected to the PCI bus 112 connected to the DRAM control IC 111. In the image processing section (the print & scanner controller) 160, an image memory 162 is connected to the DRAM control IC 161. In the image processing section (the print & scanner controller) 160, a controller control section 163 is connected to the DRAM control IC 161. A LAN control section 164 and a LAN interface 165 are connected to the DRAM control IC 161. The LAN interface 165 is connected to the LAN 3.

A basic operation of the image forming apparatus 1 is explained.

First, a procedure for accumulating image data in the image forming apparatus 1 is explained. When an image of a document is read by the scanner section 130 and image data is generated, in the scanner section 130, the image of the document is optically read from the document by the CCD 131. In this case, operation control of the CCD 131 is performed by the scanner control section 132 that receives a command from the control CPU 113. The image read by the CCD 131 is subjected to data processing by the reading processing section 116. Image data subjected to the data processing is compressed by a predetermined method in the compression/expansion IC 117 and stored in the compression memory 121 via the DRAM control IC 111. When printing data is stored in a HDD 119, compressed printing data is transferred via the DRAM control IC 111 and a controller IC 118 and stored in the HDD 119.

The printing data stored in the compression memory 121 and the HDD 119 can be managed as a job by the control CPU 113. The image memory (the DRAM) 120 and the HDD 119 are storing sections that store the image data. In the job management, printing conditions are set and stored in association with the printing data in the image memory (the DRAM) 120 and the HDD 119.

Note that the printing data and the printing conditions can be stored in different storage media as long as the printing data and the printing conditions are associated. The printing conditions are set by a user through the operation display section 140 or automatically set according to initial setting and an operation situation.

When image data is acquired from the outside, for example, image data transmitted from the terminal (the PC) 2 through the LAN 3 is stored in the image memory 162 by the DRAM control IC 161 via the LAN interface 165 and the LAN control section 164. In this embodiment, the terminal (the PC) 2 is equivalent to a printing data creating apparatus.

The printing data in the image memory 162 is once stored in the page memory 122 via the DRAM control IC 161, the PCI bus 112, and the DRAM control IC 111. When the printing data is page description data, the printing data can be converted into a raster image by the controller control section 163 through RIP processing. When image data is acquired from the outside, a processing time in the image processing section (the print & scanner controller) 160 is a part of image preparation times.

The printing data stored in the page memory 122 is sequentially sent to the compression/expansion IC 117 via the DRAM control IC 111 and subjected to compression processing and stored in the compression memory 121 via the DRAM control IC 111. When the printing data is stored in the HDD 119, the printing data is stored in the HDD 119 via the DRAM control IC 111 and the controller IC 118. These printing data are managed by the control CPU 113 as explained above. The image memory (the DRAM) 120 and the HDD 119 are storing sections that store the image data. In the job management, printing conditions are set. The image data are stored in association with the printing data in the image memory (the DRAM) 120 and the HDD 119.

Note that, the printing data and the printing conditions can be stored in different storage media as long as the printing data and the printing conditions are associated. The printing conditions are set by the user through the operation display section 140 or automatically set by the control section according to initial setting and an operation situation.

When the printing data is page description data, the printing data can be converted into a raster image by the control CPU 113 through RIP processing and stored in the compression memory 121 and the HDD 119.

When an image output is performed in the image forming apparatus 1, that is, when the image forming apparatus 1 is used as a copying machine or a printer, if the printing data stored in the compression memory 121 is used, the printing data in the compression memory 121 is sent to the compression/expansion IC 117 via the DRAM control IC 111 and expanded. If the printing data stored in the HDD 119 is used, the printing data in the HDD 119 is sent to the compression/expansion IC 117 via the controller IC 118 and the DRAM control IC 111 and expanded. Expanded image data is sent to the writing processing section 123. The image data is written in the photosensitive bodies in an LD 152 according to the printing conditions associated with the printing data. Note that, when a layout is performed, the expanded printing data is sent to the page memory 122 to obtain image data laid out in a page. The image data is sent to the writing processing section 123.

In the printer section 150, control of the sections is performed by the printer control section 151 that receives a command of the control CPU 113. In this case, the printing conditions are referred to and control based on contents of the printing conditions is performed according to necessity. In the image forming section 100, after toner images written in the photosensitive bodies are transferred onto the intermediate transfer belt 16, the toner images are transferred onto the roll paper supplied by the continuous-paper feeding section 200. The toner images are fixed by the fixing section 50. When there are a plurality of reserved jobs, the image output is sequentially performed according to set order. The paper having the image formed thereon is conveyed to the paper-discharge adjusting section 400 by the conveying path 22 through a fixing and conveying roller and wound on the roll in the paper discharge section 500 on the further downstream side.

In the photosensitive bodies, after the toner images are transferred onto the intermediate transfer belt 16, residual toner is removed by the cleaning sections. In the intermediate transfer belt 16, similarly, after the toner images are transferred onto the paper, residual toner is removed by the cleaning section.

Figure 3:
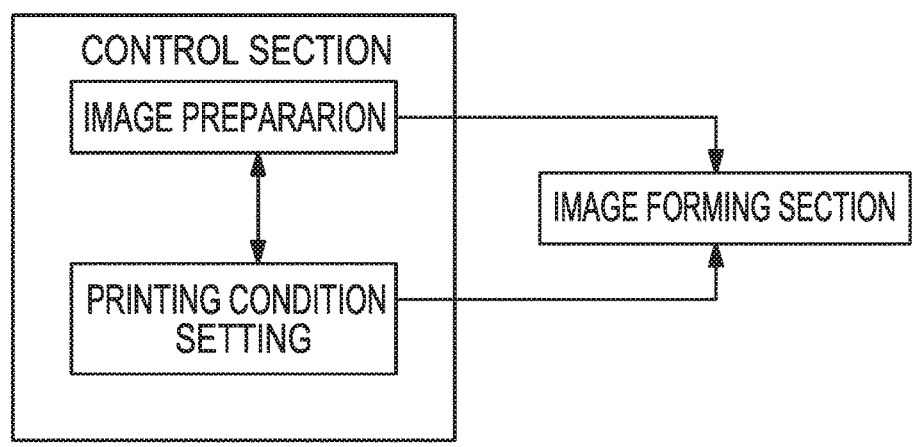
FIG. 3 is a diagram showing control blocks showing a relation between a control section and an image forming section in the embodiment.

A block diagram in which the printing conditions and the image preparation until the image data is obtained from the printing data are set by the control section to control the image forming section is shown in FIG. 3. A result of the image preparation and a result of the printing conditions are used for the control of the image forming section. The settings of the image preparation and the printing conditions are executed in association with each other.

Figure 4:
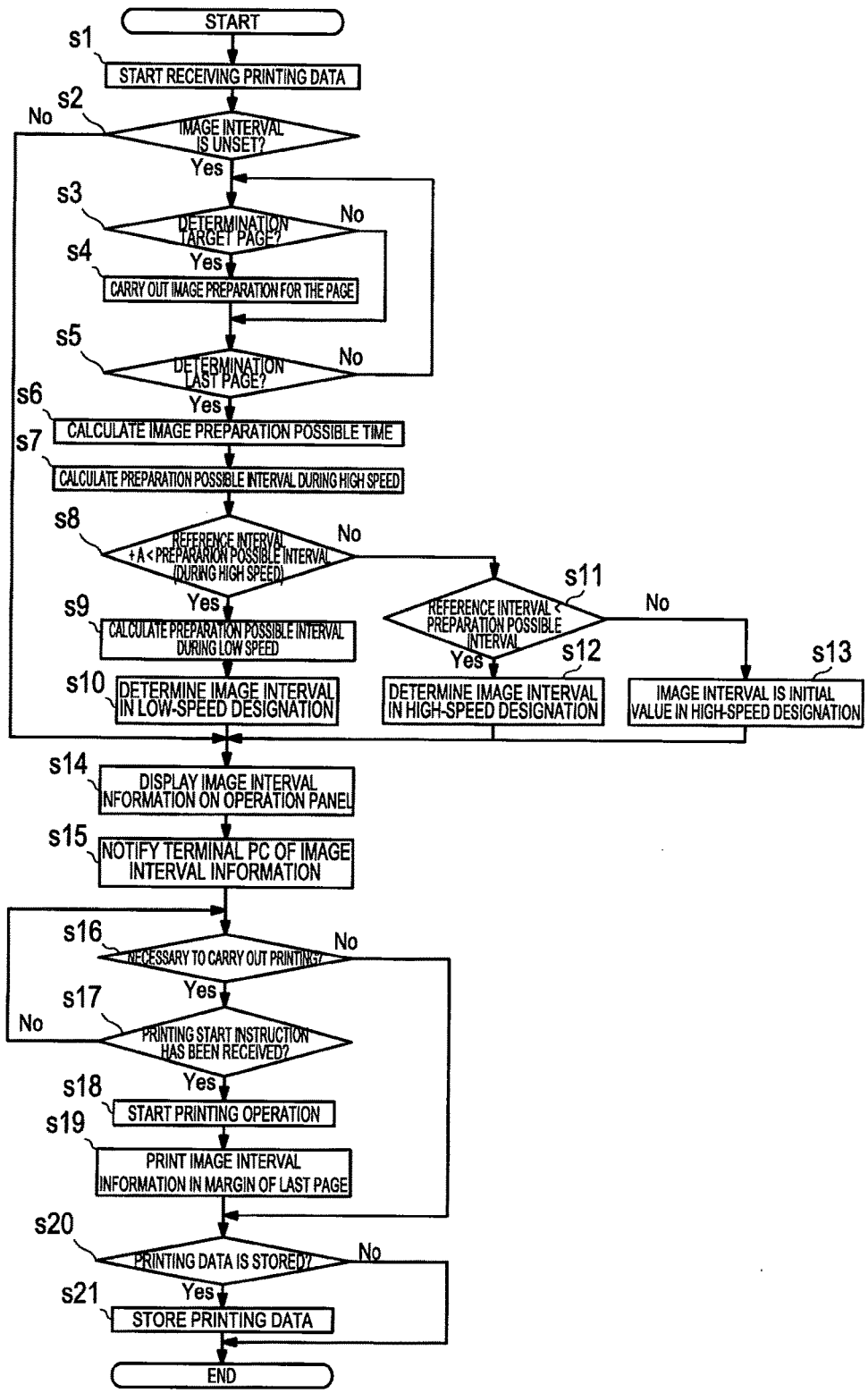
FIG. 4 is a flowchart for explaining a procedure for setting an image interval on the basis of image preparation times and performing a printing operation in the embodiment.

A procedure for performing the setting of the printing conditions and a printing operation on the basis of the printing data is explained on the basis of a flowchart shown in FIG. 4. The procedure explained below is executed by an image printing control program that operates in the control CPU 113.

The control CPU 113 starts reception of printing data concerning a job (step s1). In this procedure, the printing data is transmitted from the terminal (the PC), which is the printing data creating apparatus.

The control CPU 113 determines whether, in the received printing data, an image interval for arranging images on continuous paper is unset (step s2). If the image interval is not unset, that is, the image interval is set (No in step s2), the control CPU 113 proceeds to step s14 and displays image interval information set on an operation panel (the LCD 141). Consequently, it is possible to learn an image interval corresponding to the printing data before actually performing print processing.

If the image interval is unset (Yes in step s2), the control CPU 113 determines whether a page is a target page for determining the image interval (step s3).

The determination target can be determined by various methods. For example, all images of the printing data can be set as targets. Images from a first image to a predetermined number of the printing data can be set as targets. Consequently, it is possible to reduce the targets and quickly perform processing. The predetermined number can be set in advance by initial setting or can be set the user through the operation display section. The predetermined number can be set by the control section according to content (a total number of pages, etc.) of a job.

Further, an image having characteristics presumed to take time for image preparation can be set as the determination target.

As criteria for a page presumed to take a long preparation time, determination criteria (a page that takes time for image preparation) in automatic setting of a determination target page can be a page that comes under any one of the following.

A page in which an image itself is complicated

The page depends also on an algorithm of RIP and a processing ability of an apparatus and details of the page cannot be described. However, as a simple example, the page can be considered to depend on a file format. Formats such as a bitmap, a PDF (registered trademark), PostScript (registered trademark), and illustrator (registered trademark) tend to take time.

A page in which a plurality of images are laid out on one page like aggregation/repeat A page subjected to overlay (combination) processing such as dating or stamping If a printing data is formed by repetition of the same image or an image obtained by processing a part of the same image, first one image can be set as a target.

Repetition of completely the same image, page numbering or serial numbering of the same image, or the like is assumed. In such a case, the determination target can be relatively easily determined by print setting, pattern matching of an image page, or the like. If this condition is satisfied, only a first page can be set as a determination target page.

In the case of printing in a plurality of prints, printing data of a first print can be set as a target and, concerning a part of the printing data, the determination target can be further narrowed according to the criteria or the like.

If the page is the determination target page (Yes in step s3), the control CPU 113 performs image preparation processing concerning printing data of the page (step s4). For example, when the printing data stored in the compression memory 121 or the HDD 119 is used, the control CPU 113 sends the printing data to the compression/expansion IC 117 via the DRAM control IC 111 and expands the printing data, performs page numbering or the like, and carries out the image preparation processing. When printing data is acquired from the outside, if the printing data is page description data, the control CPU 113 performs RIP processing in an appropriate period.

During layout, time for allocating the expanded data to a page in the page memory is added to an image preparation processing time.

Subsequently, the control CPU 113 determines whether the determination target page is a last page in the determination target (step s5). If the determination target page is not the last page (No in step s5), the control CPU 113 proceeds to step s3. If the present page is the last page in the determination target (Yes in step s5), the control CPU 113 calculates an image preparation possible time from a result of carrying out the image preparation processing (step s6). A largest time among image preparation possible times is used in the following explanation.

Subsequently, the control CPU 113 calculates an interval that can be prepared when image formation is performed at high speed (step s7). Image forming speed (in a paper passing direction) in performing the image formation at high speed is set in advance (e.g., 200 mm/second). Therefore, in view of a margin of a preparation time, a preparation possible interval (during high speed) is calculated by high-speed time image forming speed×(image preparation possible time+margin). The control CPU 113 sets a reference interval from an image size in the paper passing direction and an image interval of an initial value set in advance and determines whether a sum of the reference interval and a determination interval A is smaller than the image preparation possible time (during high speed) (step s8). The determination interval A is set taking into account an allowable margin, variation, and the like.

If the reference interval+A is smaller than the image preparation possible time (during high speed) (Yes in step s8), image formation is late. Therefore, the control CPU 113 calculates a reference possible interval during low speed of the image forming speed (step s9). Image forming speed (in the paper passing direction) in performing the image formation at low speed is set in advance (e.g., 100 mm/sec). Therefore, a preparation possible interval (during low speed) is calculated by low-speed time image forming speed× (image preparation possible time+margin). Note that, for example, when the image forming speed can be changed in multiple stages, it is also possible to attain both of productivity and suppression of a margin amount by combining a change in the image forming speed and adjustment of an image interval.

After step s10, the control CPU 113 displays image interval information set on the operation panel (step s14).

If reference interval+A is not smaller than the image preparation possible time (during high speed) in step s8 (No in step s8), the control CPU 113 determines whether the reference interval is smaller than the image preparation possible time (step s11). If the reference interval is smaller than the image preparation possible time (Yes in step s11), the control CPU 113 sets the image forming operation to high speed, sets the image interval to 20 mm (step s12), and proceeds to step s14. If the reference interval is not smaller than the image preparation possible time (No in step s11), the control CPU 113 sets the image forming operation to high speed, set the image interval to an initial value (step s13), and proceeds to step s14.

Figure 5:
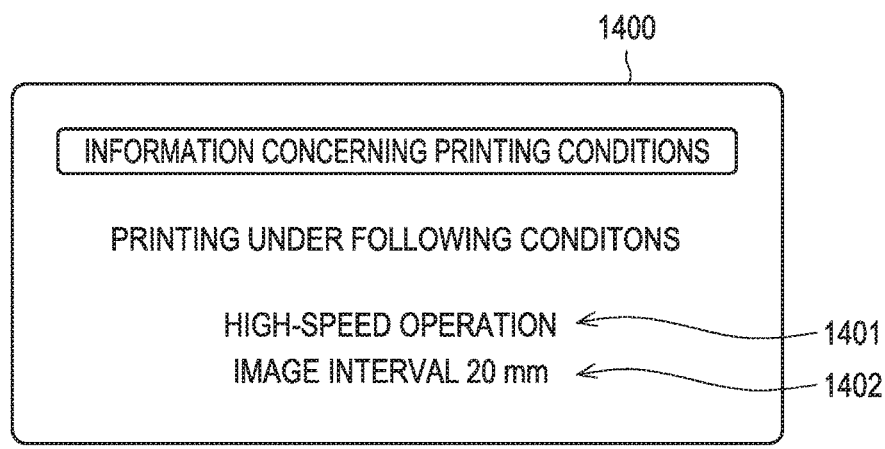
FIG. 5 is a diagram showing a notification screen for set printing conditions in the embodiment.

An example of a notification screen 1400 displayed in step s14 is shown in FIG. 5. The notification screen 1400 is displayed on the LCD 141 of the operation display section 140. The notification screen 1400 includes a speed display section 1401 indicating the image forming speed and an interval display section 1402 indicating an image interval. The user can grasp, through the notification screen, setting of printing conditions before printing. The notification screen is displayed on the operation display section of the image forming apparatus. Besides, the notification screen can be notified to the terminal (the PC), a server, or the like independently or in combination with a notification destination.

Figure 6:
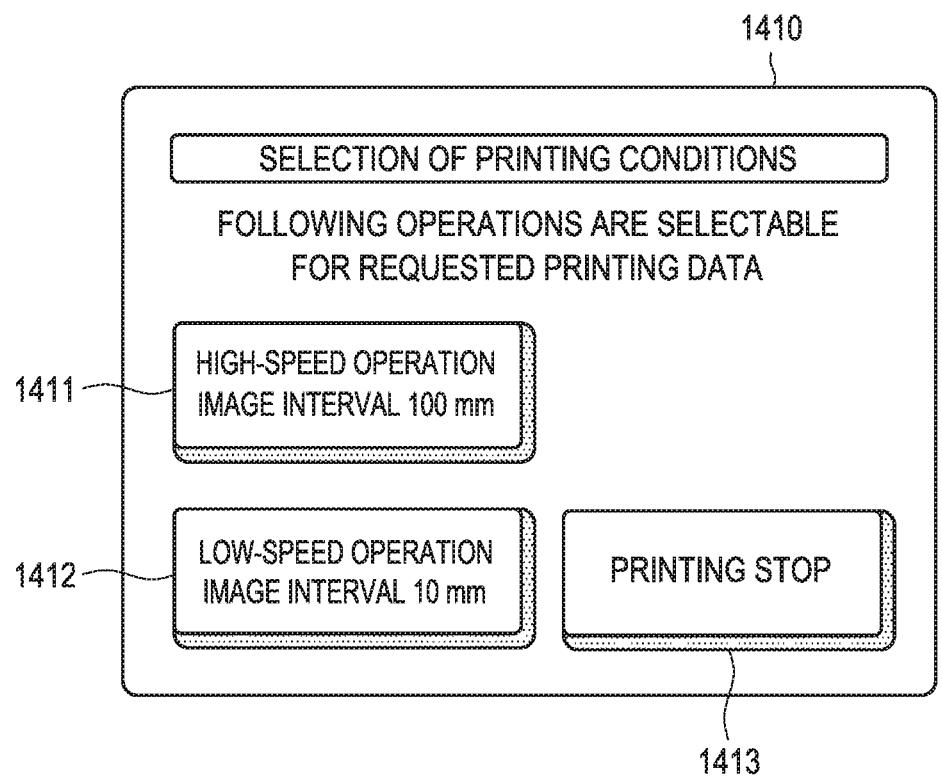
FIG. 6 is a diagram showing an operation screen for the set printing conditions in the embodiment.

Note that, in this example, as a result of the calculation of the image interval, the image forming speed is automatically selected. However, printing conditions (operating speed and the image interval) can be displayed on the operation section or the like to urge the user to select the image forming speed. An operation screen 1410 in the example is shown in FIG. 6.

On the operation screen 1410, as setting for performing image formation in time, a first selection button 1411, a second selection button 1412, and a printing stop button 1413 are displayed to be capable of being pressed. In the first selection button 1411, a high-speed operation and an image interval of 100 mm can be set. In the second selection button 1412, a low-speed operation and an image interval of 10 mm is set. In the present setting, the buttons can be reversely displayed or setting content can be displayed in a display field.

The operation screen is displayed on the operation display section of the image forming apparatus. Besides, the operation screen can be notified to the terminal (PC), the server, or the like independently or in combination with a notification destination.

After displaying the image interval information in the image forming apparatus 1 (step s14), the control CPU 113 notifies the terminal PC of the image interval information (step s15).

In the image forming apparatus, the control CPU 113 determines whether it is necessary to carry out printing from the terminal PC (step s16). It is unnecessary to carry out the printing, for example, when the printing is not immediately performed, the image interval is checked, and the printing conditions are set and recorded as a stored job. When it is unnecessary to carry out the printing (No in step s16), the control CPU 113 shifts to step s20 and determines whether the printing data is stored. If it is necessary to carry out the printing (Yes in step s16), the control CPU 113 determines whether a printing start instruction has been received (step s17). The printing start instruction is performed by the image forming apparatus 1. Besides, the printing start instruction can be performed via the terminal (the PC), the server, or the like.

When the printing start instruction has not been received (No in step s17), the control CPU 113 returns to step s16 for determining whether printing is necessary. For example, when execution turn of the stored job comes, the control CPU 113 shifts to a state in which the printing is necessary.

If the printing start instruction has been received (Yes in step s17), the control CPU 113 starts the printing operation (step s18). In the printing operation, the control CPU 113 prints the image interval information in a margin of the last page (step s19). Subsequently, the control CPU 113 determines whether the printing data is stored (step s20). The storage of the printing data can be set in advance. At this stage, an inquiry screen can be displayed in the operation display section or the like to enable the user to select whether the printing data is stored.

If it is determined that the printing data is stored (Yes in step s20), the control CPU 113 stores the printing data in the storing section in association with the printing conditions (step s21) and ends the processing. If it is determined that the printing data is not stored (No in step s20), the control CPU 113 ends the processing.

For example, when the image data is repetition of the same image or an image obtained by processing a part of the same image, repetition of completely the same image, page numbering or serial numbering of the same image, or the like is assumed. In such a case, the determination target can be relatively easily determined by print setting, pattern matching of an image page, or the like. Therefore, if this condition is satisfied, only a first page can be set as a determination target page.

Figure 11:
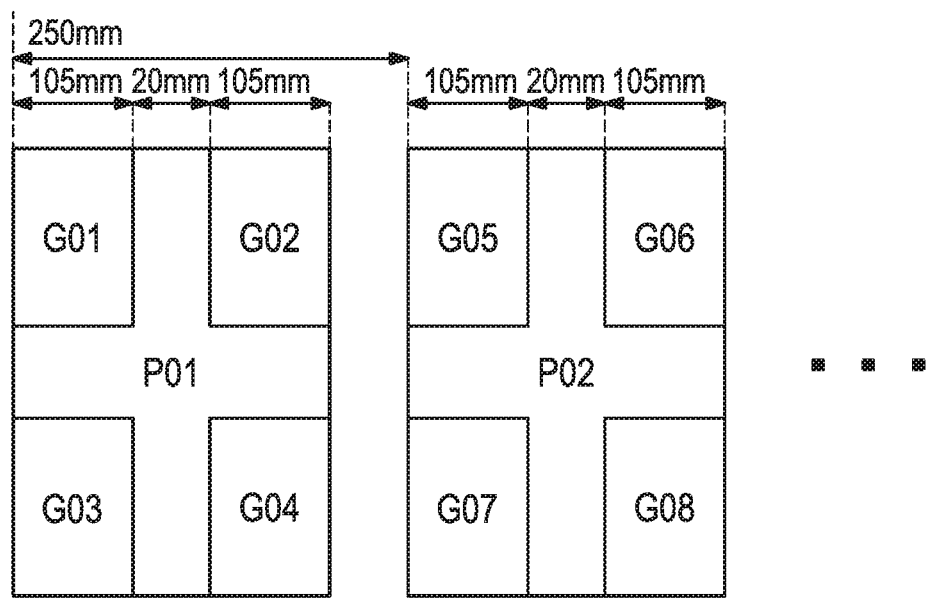
FIG. 11 is a diagram showing an image interval in a layout in still another example in the embodiment.

Image layout performed when the image interval is extended by page aggregation setting under the calculated printing condition is explained. For example, when a printing operation for setting an image size to ½ and four images are aggregated and treated as one page is considered, it is important to align an interval between an image and an image rather than aligning an interval between a page and a page. Therefore, as shown in FIG. 11, an interval in the paper passing direction between laid-out images is set as 20 mm.

A processing time corresponding to the number of image pages is required for the RIP processing including expansion and reduction of the images. However, since there is almost no difference concerning a shift of an image position, time necessary for shift processing is not taken into account.

EXAMPLES

Examples of the present invention are explained.

Note that all the examples explained below are based on conditions explained below. Configurations and operation conditions can be set in the image forming apparatus in advance or can be set by the operator using the operation panel.
An image of A4 size=paper passing direction 210 [mm] is printed on continuous paper.
The image forming apparatus is capable of operating at two kinds of image forming speed, i.e., high speed 200 [mm/s] and low speed 100 [mm/s].

A value of the image forming speed can be switched according to, for example, a level of a fixing temperature. As an initial value of an image interval, 10 [mm] is used. A reference interval of images is an image size+10 [mm].

Note that the image interval can be printed in, for example, a margin of a first page to be printed.
Unless image formation preparation for the previous page is not completed, image preparation for the next page cannot be started.
Only when the image preparation is completed, image formation on the relevant page can be started.
Taking into account a processing delay during an actual printing operation, a margin equal to or larger than 50 ms is secured for an image interval with respect to image preparation times.
Image preparation times with respect to image pages Pn are represented as Tn.
   (n (integer)=01, 02, . . . )
Image data are represented by Gn. When an aggregation/repeat function or the like is not used, it can be regarded as Pn=Gn.
In execution of a printing operation, a blank (a break) occurs in a paper because of pre-processing and post-processing of an electrophotographic process.

Example 1

Figure 7:
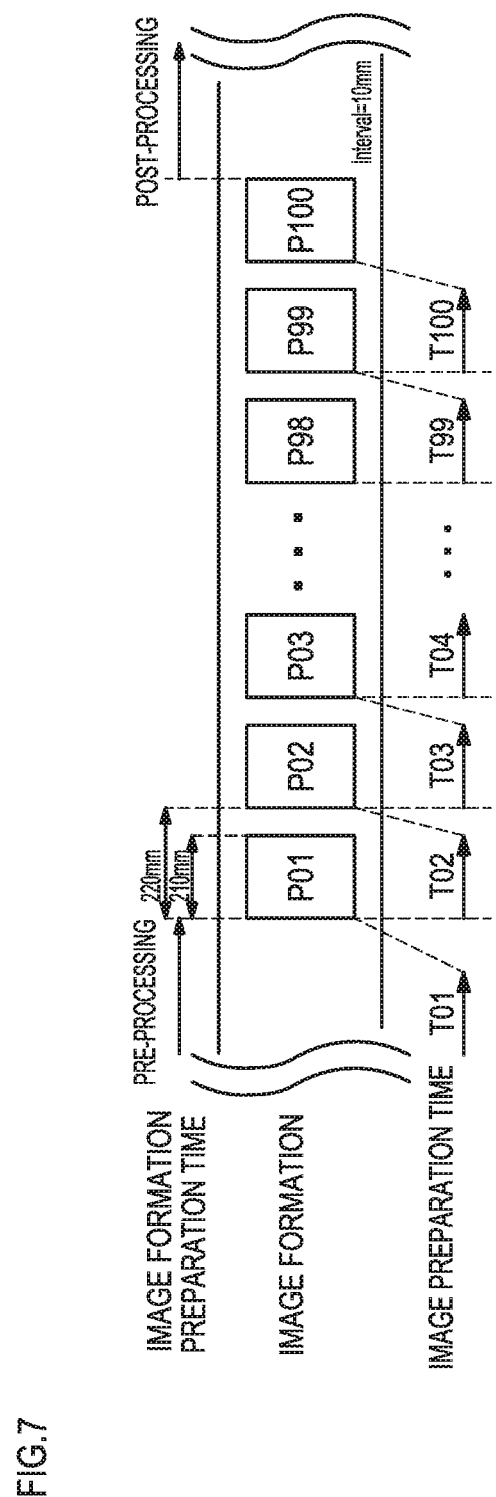
FIG. 7 is a diagram showing an image interval in an example in the embodiment.

An example 1 is explained with reference to FIG. 7.
[Setting]
   Determination last page: last page (=P100)
   Determination target page: all
   Setting of printing conditions is performed according to a processing procedure explained below. Note that the processing procedure is performed according to the flowchart of FIG. 4.

(1) Start reception of printing data from a client PC.
(2) Do not start a printing operation while an image interval is unset.
(3) Perform image preparation from P01 to the determination last page (P100). When image data reception is late, wait for image data any time.
   In this example, it is assumed that a maximum of image preparation times is 1000 [ms].
(4) As explained below, since a reference interval is larger than a preparation possible interval, keep operation speed at high speed and keep the image interval at initial setting 10 [mm]. Set a determination interval A to 20 mm taking into account variation.
   Reference interval: 220 [mm] (=210 [mm]+10 [mm])
   Preparation possible interval (high speed): 210 [mm] (=200 [mm/s]×(1000+50)/1000 [s])<(220 [mm]+20 [mm])
(5) In a high-speed operation, update a printing condition to an image interval 10 [mm] shown in FIG. 7.
(6) Display printing conditions (the speed and the image interval) on the operation section and notify the client PC of the printing conditions.
(7) Store the printing data in the HDD of the image forming apparatus.
(8) After the processing of (7), when a printing start instruction for the data stored in the HDD is received, perform a printing operation according to the image interval.
(9) After finishing image formation of the last page (P100), as shown in FIG. 7, an image interval (Interval=10 mm) is printed in a margin portion.

Example 2

Figure 8:
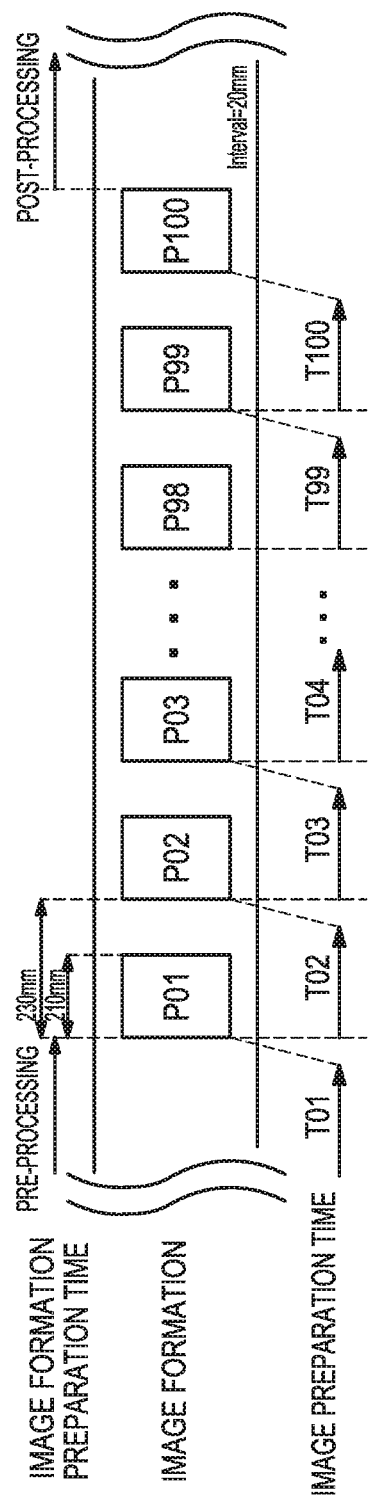
FIG. 8 is a diagram showing an image interval in another example in the embodiment.

An example 2 is explained with reference to FIG. 8.
In this example, printing conditions are calculated from information up to a predetermined page and a printing operation is performed.
[Setting]
   Determination last page: set to 20 pages (=P20)
   Determination target page: all
(1) Start reception of printing data from the client PC.
(2) Do not start a printing operation while an image interval is undecided.
(3) Perform image preparation from P01 to the determination last page (P20). When image data reception is late, wait for image data any time.
   In this example, it is assumed that a maximum of image preparation times is 1100 [ms].
(4) As explained below, since a difference between a preparation possible interval and a reference interval does not exceed 20 [mm], change operation speed to high speed and change the image interval to 20 [mm].
   Reference interval: 220 [mm] (=210 [mm]+10 [mm])
   Preparation possible interval (high speed): 230 [mm] (=200 [mm/s]×(1100+50)/1000 [s])<(220 [mm]+20 [mm])
   ○
(5) In a high-speed operation, as shown in FIG. 8, update a printing condition to an image interval 20 [mm].
(6) Display printing conditions (the speed and the image interval) on the operation section and notify the client PC of the printing conditions.
(7) When a printing start is instructed, start a printing operation from P01. Start image preparation processing from P01 in parallel to the printing operation.
(8) After finishing the image formation of the last page (P100), as shown in FIG. 8, an image interval (Interval=20 mm) is printed in a margin portion.

(9) If storage of printing data is instructed, store the printing data in the HDD of the image forming apparatus.

Example 3

An example 3 is explained with reference to FIG. 9.

In this example, printing conditions are calculated from information of a first print and a printing operation is performed.

[Setting]

Determination last page: set to one print (=P10)

Determination target page: automatically set (only a page presumed to take a long preparation time)

(1) Start reception of printing data from the client PC.

(2) Do not start a printing operation while an image interval is undecided.

(3) Perform image preparation from P01 to the determination last page (P10). When image data reception is late, wait for image data any time.

However, since the determination target page is automatically set, the image preparation is carried out for only the page presumed to take a long preparation time.

In this example, it is assumed that a maximum of image preparation times is 1500 [ms].

(4) As explained below, since a difference between a preparation possible interval and a reference interval exceeds 20 [mm], change operation speed to low speed and calculate an image interval.

Reference interval: 220 [mm] (=210 [mm]+10 [mm])

Preparation possible interval (high speed): 310 [mm] (=200 [mm/s]×(1500+50)/1000 [s])>(220 [mm]+20 [mm])×

Preparation possible interval (low speed): 155 [mm] (=100 [mm/s]×(1500+50)/1000 [s]) ○

Figure 9:
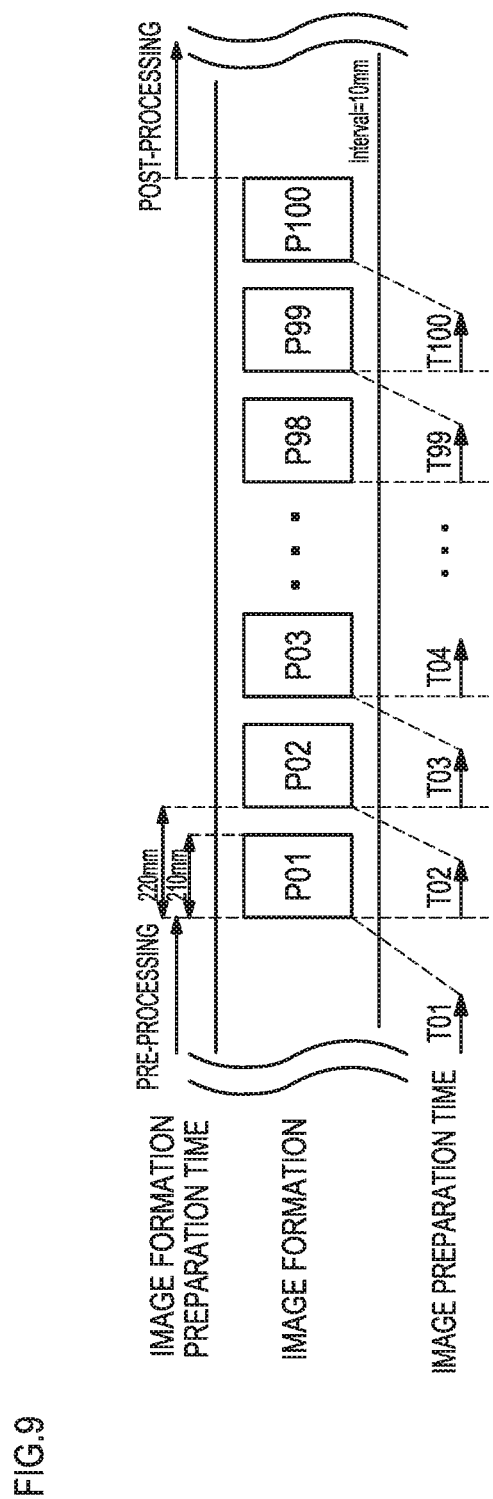
FIG. 9 is a diagram showing an image interval in still another example in the embodiment.

(5) In a low-speed operation, as shown in FIG. 9, update a printing condition to an image interval 10 [mm].

(6) Display printing conditions (the speed and the image interval) on the operation section and notify the client PC of the printing conditions.

(7) When a printing start is instructed, start a printing operation from P01. Start image preparation processing from P01 in parallel to the printing operation.

(8) After finishing the image formation of the last page (P100), as shown in FIG. 9, an image interval (Interval=10 mm) is printed in a margin portion.

(9) If storage of printing data is instructed, store the printing data in the HDD of the image forming apparatus.

Figure 10:
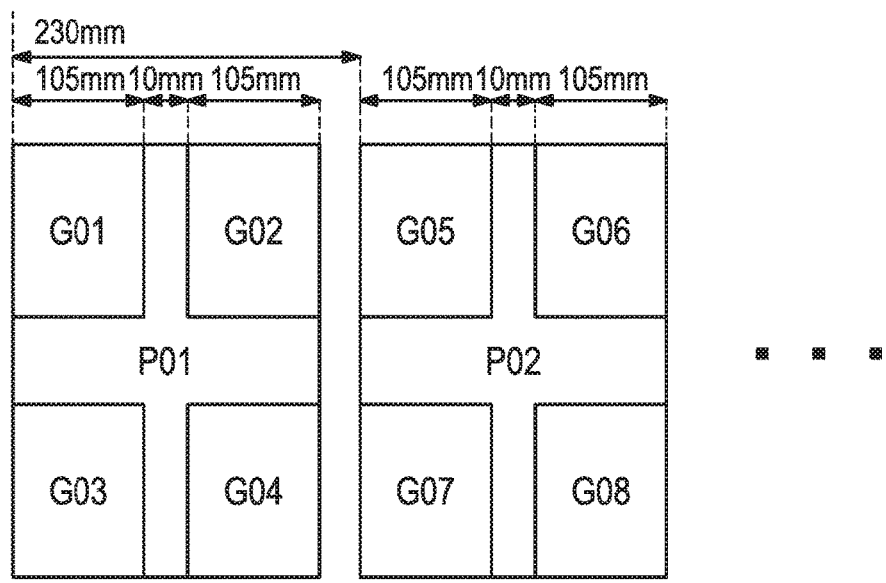
FIG. 10 is a diagram showing an image interval in a layout in still another example in the embodiment.

Note that, when a printing operation for setting an image size to ½ and four images are aggregated and treated as one page is considered, it is important to align an interval between an image and an image rather than aligning an interval between a page and a page. Image arrangement in the case in which an image interval is determined as 10 [mm] is treated as printing data shown in FIG. 10. Image arrangement in the case in which an image interval is determined as 20 [mm] is treated as printing data shown in FIG. 11.

The determination process for an image interval can be performed along the above examples.

A processing time corresponding to the number of image pages is required for the RIP processing including expansion and reduction of the images. However, since there is almost no difference concerning a shift of an image position, time necessary for shift processing need not to be taken into account.

That is, according to the embodiment, it is possible to execute an image output in time for printing timing, it is possible to reduce a blank region between an image and an image on a paper as much as possible, and it is possible to fix an image interval and print the images on continuous paper. That is, in the present invention, it is possible to attain both of minimization of the image interval and fluctuation suppression.

The present invention is explained above on the basis of the embodiment and the examples. However, the present invention is not limited to the contents described in the embodiment and the examples and, naturally, can be changed as appropriate without departing from the spirit of the present invention.

What is claimed is:

1. An image forming apparatus comprising:
   an image forming section that performs image formation on continuous paper based on image data converted from printing data; and
   a processor configured to perform image preparation to convert the printing data into the image data and control the image forming section to execute forming of an image on the continuous paper based on the image data, wherein
   the processor is further configured to perform, before the image formation, second forming speeds setting according to image sizes in a paper passing direction, predetermined first image forming speeds, and image preparation times related to the images.

2. The image forming apparatus according to claim 1, wherein the processor performs arranging a plurality of images formed on the continuous paper at equal intervals.

3. The image forming apparatus according to claim 1, wherein, in the second forming speeds setting, the processor performs comparison of a reference interval and a preparation possible interval, the reference interval is an interval of images for reference which is determined based on an image size in a paper passing direction, the preparation possible interval is an interval which is determined based on the first image forming speed and the image preparation times and which is necessary for the image preparation and
   setting of the second forming speeds is based on a result of the comparison of the reference interval and the preparation possible interval.

4. The image forming apparatus according to claim 3, wherein, in the second forming speeds setting, when the processor determines that the preparation possible interval is equal to or smaller than the reference interval, the processor sets the second forming speed at a first speed, and, when the processor determines that the image preparation possible interval is larger than the reference interval, the processor sets the second forming speed at a second speed which is lower than the first speed.

5. The image forming apparatus according to claim 1, wherein, in the second forming speeds setting, the processor calculates preparation times with respect to all images of the printing data and calculates the image preparation times based on a maximum of the preparation times.

6. The image forming apparatus according to claim 1, wherein, in the second forming speeds setting, the processor calculates preparation times with respect to images from a first image to a predetermined number of the printing data and calculates the image preparation times based on a maximum of the preparation times.

7. The image forming apparatus according to claim 1, wherein, in the second forming speeds setting, the processor calculates preparation times of image data having a characteristic presumed to take time for image preparation and calculates the image preparation times based on a maximum of the preparation times.

8. The image forming apparatus according to claim 1, wherein, in the second forming speeds setting, in a case of printing data configured by repetition of a same image or an image obtained by processing a part of the same image, the processor calculates a preparation time of first one image and calculate the image preparation time based on the preparation time of the first one image.

9. The image forming apparatus according to claim 1, wherein, in the second forming speeds setting, in a case of printing data configured by a plurality of prints, the processor calculates the image preparation times on the basis of the images of printing data of a first print.

10. The image forming apparatus according to claim 1, wherein, after receiving an execution instruction for a printing operation based on the printing data, the processor calculates the second forming speed in the second formation speeds setting.

11. The image forming apparatus according to claim 1, wherein the processor stores the second forming speed in association with the printing data, and controls the image forming section to perform forming of the images using the stored second forming speed when same printing data is reprinted.

12. The image forming apparatus according to claim 1, wherein, when a notification request for printing conditions is sent from a printing data creating apparatus outside the image forming apparatus to the image forming apparatus, after receiving the printing data, the processor is configured to perform the second forming speeds setting and notifies the printing data creating apparatus of the set second forming speed.

13. The image forming apparatus according to claim 1, wherein the processor notifies a user of the set second forming speed.

14. The image forming apparatus according to claim 1, wherein the processor notifies a user of the set second forming speed after the image formation.

15. The image forming apparatus according to claim 1, wherein the processor notifies a user of the set second forming speed to enable the user to select the second forming speed or to stop the image formation.

16. The image forming apparatus according to claim 1, wherein the processor controls the image forming section to print, in a margin portion of continuous paper, information of the second forming speed.

17. An image printing method comprising:
a step for converting printing data into image data;
a step for setting, before the image formation, a second forming speed according to image sizes in a paper passing direction, a predetermined first image forming speed, and image preparation times related to the images; and
an image forming step for forming, on the basis of the image data, an image on continuous paper according to the set second forming speed.

18. A non-transitory computer-readable recording medium having stored therein a program that controls an image forming apparatus to perform the image printing method according to claim 17.

19. A non-transitory computer-readable recording medium having stored therein a program that controls an image forming apparatus according to claim 18, wherein
the program controls the image forming apparatus to perform arranging of, in the case of forming a plurality of images on the continuous paper by the image forming apparatus, a plurality of images at equal intervals.

20. A non-transitory computer-readable recording medium having stored therein a program that controls an image forming apparatus according to claim 18, wherein
the program controls the image forming apparatus to perform comparison of a reference interval and a preparation possible interval, the reference interval is an interval of images for reference which is determined based on an image size in a paper passing direction, the preparation possible interval is an interval which is determined based on the first image forming speed and the image preparation times and which is necessary for the image preparation and
setting the second forming speed based on a result of the comparison of the reference interval and the preparation possible interval.

* * * * *